US008393833B1

(12) United States Patent
Juranek (10) Patent No.: US 8,393,833 B1
(45) Date of Patent: Mar. 12, 2013

(54) LATERALLY CUTTING SAW BLADE ASSEMBLY

(76) Inventor: Thomas L. Juranek, Harrisburg, SD (US)

( * ) Notice: Subject to any disclaimer, the term of this patent is extended or adjusted under 35 U.S.C. 154(b) by 160 days.

(21) Appl. No.: 13/076,572

(22) Filed: Mar. 31, 2011

(51) Int. Cl.
*B23C 1/16* (2006.01)

(52) U.S. Cl. .......... 409/93; 83/565; 144/2.1; 144/144.1; 409/124

(58) Field of Classification Search .......... 83/471.2, 83/869, 375, 391, 743, 776, 779, 780, 565, 83/781, 452, 467.1, 468, 468.1, 468.2, 468.4, 83/468.7, 483, 485, 487, 522.11, 522.15–522.17, 83/522.22, 821, 859; 144/2.1, 4.7, 1.1, 41, 144/144.1, 372; 409/93, 92, 124, 130, 125, 409/126; 451/237, 281
See application file for complete search history.

(56) References Cited

U.S. PATENT DOCUMENTS

| | | | |
|---|---|---|---|
| 4,079,648 A | 3/1978 | Chappell | |
| 4,763,703 A | 8/1988 | Fromm | |
| 4,909,111 A | 3/1990 | Noble | |
| 5,090,283 A | 2/1992 | Noble | |
| 5,363,732 A * | 11/1994 | Heasley | 83/471.2 |
| 6,006,641 A * | 12/1999 | Fletcher | 83/471.3 |
| 6,095,726 A * | 8/2000 | Scott et al. | 409/92 |
| 6,142,199 A * | 11/2000 | Schibline | 144/363 |
| 6,854,372 B2 | 2/2005 | Anthony | |
| 6,877,238 B2 | 4/2005 | Kanaga | |
| 7,111,537 B2 | 9/2006 | Vallone | |
| 7,159,498 B2 | 1/2007 | Stewart | |
| 2003/0190202 A1 * | 10/2003 | Scott et al. | 409/92 |
| 2003/0221531 A1 | 12/2003 | Anthony | |
| 2005/0109181 A1 | 5/2005 | Zawadzki | |

* cited by examiner

*Primary Examiner* — Phong Nguyen (57) ABSTRACT

A wall trim coping assembly includes a frame with a front side, a back side, a first lateral side and a second lateral side. A plurality of first rails extends between the front and back sides. A chassis is mounted on the first rails. A second rail is mounted to the chassis and is orientated perpendicular to the first rails. A cutting assembly is mounted on the second rail. A receiving plate is mounted on the frame and a guide plate is mounted to the frame. An engagement member mounted to a chassis is configured to engage and follow the contouring of a face of guide trim removably clamped to the receiving plate. Wall trim is positioned on the receiving plate and is cut by the cutting assembly as the engagement member follows the guide trim.

10 Claims, 7 Drawing Sheets

LATERALLY CUTTING SAW BLADE ASSEMBLY

BACKGROUND OF THE DISCLOSURE

1. Field of the Disclosure

The disclosure relates to trim coping devices and more particularly pertains to a new wall trim coping assembly particularly well suited for coping the end of trim to allow two pieces of trim, coming together at an angle, to be abutted against each other in a flush manner.

2. Summary of the Disclosure

An embodiment of the disclosure meets the needs presented above by generally comprising a frame that includes an upper support, a lower support and a vertical support surrounding an interior. The frame includes a front side, a back side, a first lateral side and a second lateral side. A plurality of first rails is mounted to the frame and extends between the front and back sides of the frame. A chassis is mounted on the first rails and is slidable along the rails to be moved towards or away from the front side. A second rail is mounted to the chassis and is orientated perpendicular to the first rails. A cutting assembly includes a saw blade and motor for rotating the saw blade. The cutting assembly is mounted on the second rail and is movable toward the first or second lateral sides along the second rail. A receiving plate is mounted on the frame and is positioned to allow the saw blade to move adjacent to the receiving plate. A guide plate is mounted to the frame and has a first side. The first side of the guide plate and a top side of the receiving plate each lie in a plane orientated parallel to an axis of rotation of the saw blade. An engagement member is configured to engage and follow the contouring of a face of guide trim removably clamped to the first side. The engagement member is mounted to the chassis. A clamping member is mounted on the receiving plate and is configured to retain a piece of wall trim on the top side of the receiving plate such than an end of the wall trim extends over an edge of the receiving plate and toward the saw blade. As the engagement member moves along the face of the guide trim, the cutting assembly copes the wall trim positioned on the receiving plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new trim coping device embodying the principles and concepts of an embodiment of the disclosure and generally designated by the reference numeral 10 will be described.

As best illustrated in FIGS. 1 through 9, the wall trim coping assembly 10 generally comprises a frame 12 that includes an upper support 13, a lower support 14 and a vertical support 15 surrounding an interior. The frame 12 includes a front side 16, a back side 17, a first lateral side 18 and a second lateral side 19. The frame 12 may include outer vertical supports 20 extending between the upper 13 and lower 14 supports.

A plurality of first rails 21 is mounted to the frame 12 and extend between the front 16 and back 17 sides of the frame 12. As shown in the Figures, each of the first rails 21 may be positioned adjacent to one of the first 18 and second 19 lateral sides. A chassis 22 is mounted on the first rails 21 and is slidable along the first rails 21 to be moved towards or away from the front side 16. A second rail 23 is mounted to the chassis 22 and is orientated perpendicular to the first rails 21.

Figure 3:
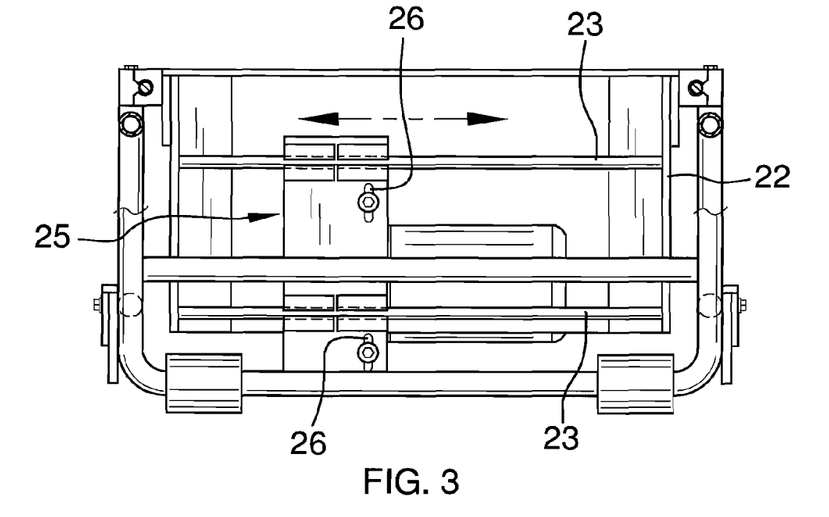
FIG. 3 is a rear broken view of an embodiment of the disclosure.
Figure 4:
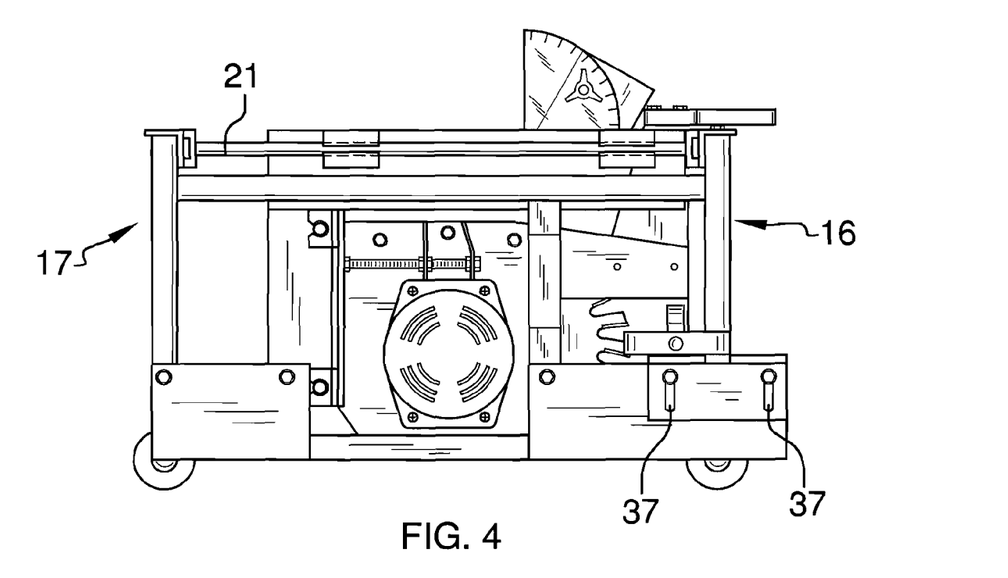
FIG. 4 is a left side view of an embodiment of the disclosure.
Figure 5:
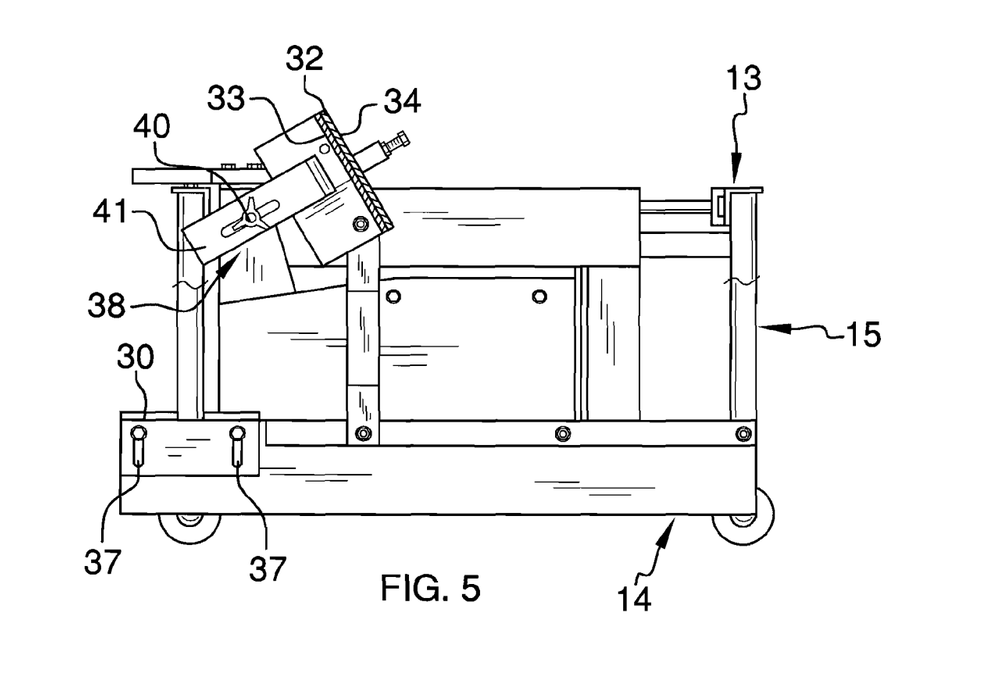
FIG. 5 is a right side view of an embodiment of the disclosure.
Figure 6:
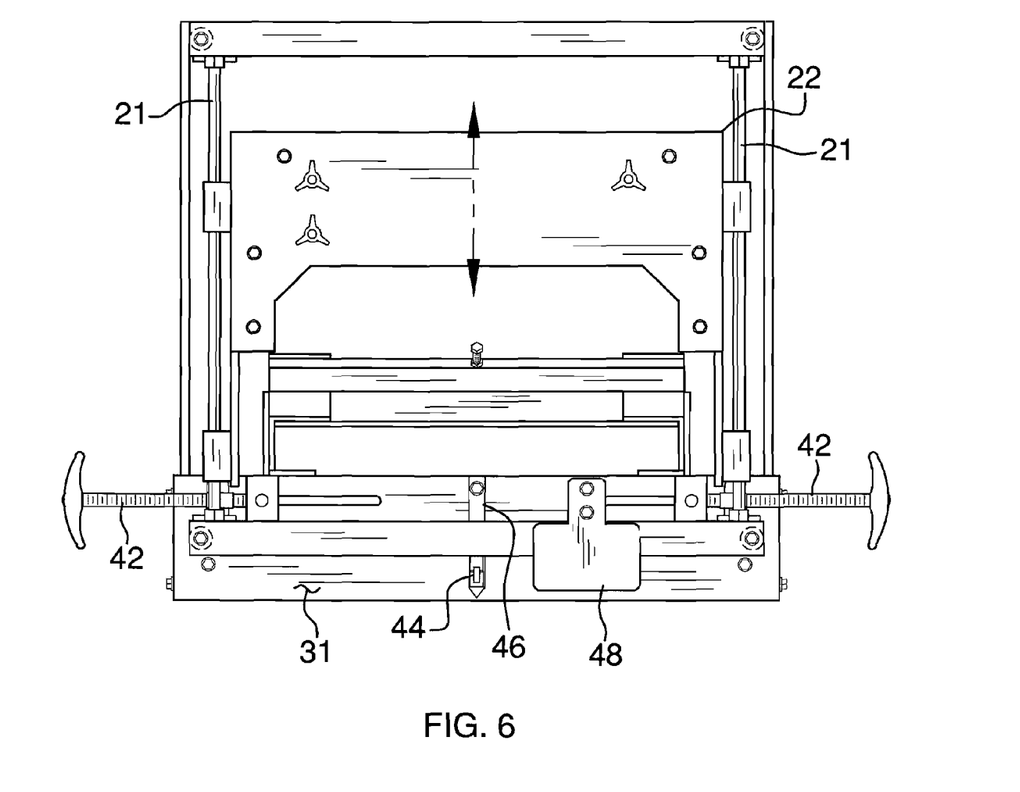
FIG. 6 is a top view of an embodiment of the disclosure.

A cutting assembly 25 includes a saw blade 27 and motor 28 for rotating the saw blade 27. The cutting assembly 25 is mounted on the second rail 23. The cutting assembly 25 is movable toward the first 18 or second 19 lateral sides along the second rail 23. The saw blade 27 is a circular saw blade and the cutting assembly 25 is electrically powered. As can be seen in FIG. 3, multiple second rails 23 may be utilized. The first 21 and second 23 rails allow the cutting assembly 25 to move on two axes. The cutting assembly 25 is mounted to the second rail 23, or rails, by securing members extending through vertically orientated elongated slots 26. The elongated slots 26 allow the cutting assembly 25 to lowered or raised as needed.

A receiving plate 30 is mounted on the frame 12 and has a fixed position relative to the frame 12 such that the receiving plate 30 is not movable laterally on the frame 12 or nearer or further from front side 16. The receiving plate 30 is positioned adjacent to the front side 16 of the frame 12. The receiving plate 30 is positioned to allow the saw blade 27 to move adjacent to the receiving plate 30 and may be positioned so that the cutting assembly 25 remains spaced from the receiving plate 30. This will ensure that cutting assembly 25 does not contact the receiving plate 30 and damage the saw blade 27. The term "fixed" with respect to the receiving plate 30 is being used to indicate that receiving plate 30 is not moved during the operation of the assembly 10. However, as can be seen in the Figures, vertically orientated elongated notches 37 may be used as connecting areas for the receiving plate 30 to allow the receiving plate 30 to be slightly adjusted vertically with respect to the cutting assembly 25.

A guide plate 32 is mounted to the frame 12 and has a fixed position relative to the frame 12 to allow the saw blade 27 to move relative to the guide plate 32. The guide plate 32 has a first side 33 and a second side 34. The first side 33 of the guide plate 32 and a top side 31 of the receiving plate 30 each lie in a plane orientated parallel to an axis of rotation of the saw blade 27. The guide plate 32 may be rotatable to allow an angle of the first side 31 with respect to a vertical plane to be altered. An angle indicator may be used to indicate the angle indicator of the guide plate 32.

Figure 2:
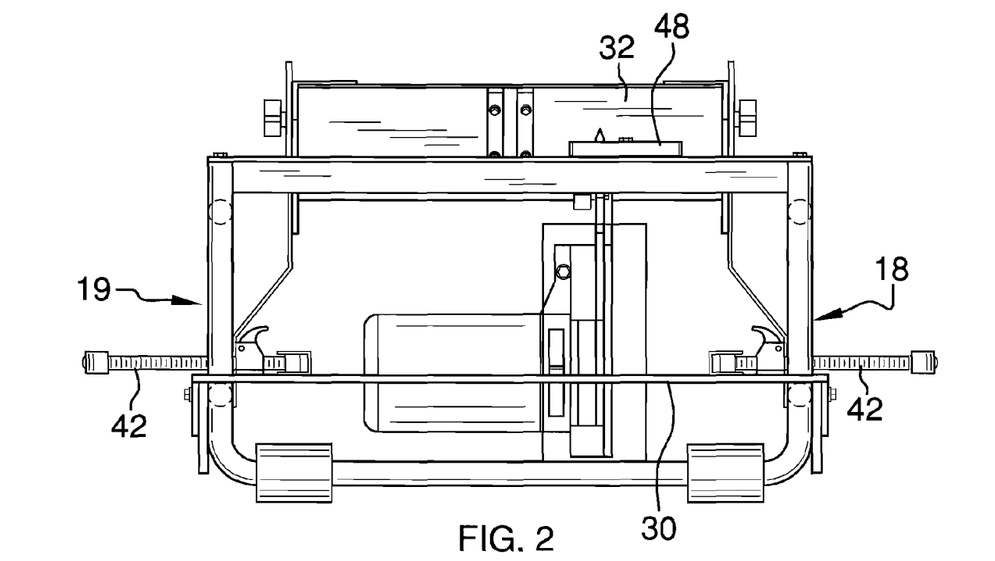
FIG. 2 is a front broken view of an embodiment of the disclosure.

An engagement member 38 is configured to engage and follow the contouring of a face of guide trim 71 removably clamped to the first side 33. The guide trim 71 is a piece of wall trim having contours which will be followed to cope the end 74 of wall trim 70. As can be seen in FIG. 2, the guide plate 32 may include stops 35 against which the guide trim 71 is positioned. A pair of stops 35 may be used to place guide trim 71 pieces on opposite sides of the stops 35. This will allow both the left and right ends wall trim 70 to be coped. The guide plate 32 may have openings therein to allow the stops 35 to be moved where needed. Securing members 36 are used to retain the guide trim 71 on the guide plate 32.

The engagement member 38 is mounted to the chassis 22. The engagement member 38 includes a mount 40 that is attached to the chassis 22 and a rod 41 is attached to the mount 40. The rod 41 extends toward the first side 33 of the guide plate 32. The rod 41 has a free end that is configured to be movable across the face of the guide trim 71. The rod 41 is movable on the mount 40 to allow the rod 41 to be moved toward or away from the first side 33. The rod 41 is pivotable with respect to the mount 40 to allow the free end to be vertically lifted or lowered. The ability to move the rod 41 and the guide plate 32 will allow the depth of the cut to be adjusted. This provides for depth adjustment of a cut in relation to varying thicknesses of end 74. It should be understood that the position of the engagement member 38 and the guide plate 32 may be altered as shown in the Figures, and in fact may be reversed. Additionally, the orientation of the guide plate 32 may be altered such that it is horizontally orientated with the guide trim 71 facing upwardly, or angled rearwardly, on the assembly 10 as the important feature of the assembly 10 is the cutting assembly's 25 ability to move with respect to the receiving plate 30 as it follows the contours of the guide trim 71.

Figure 1:
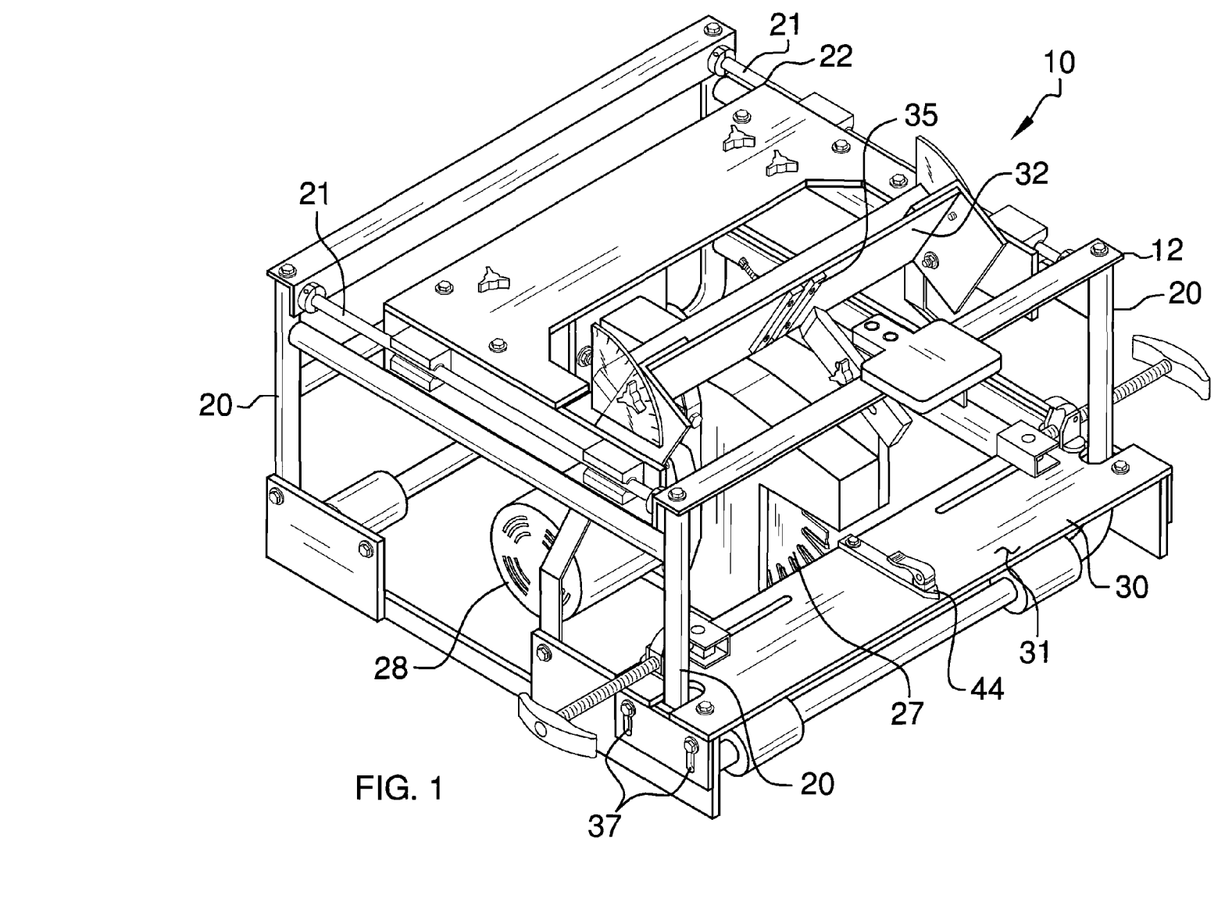
FIG. 1 is a top perspective view of a wall trim coping assembly according to an embodiment of the disclosure.

A clamping member 42 is mounted on the receiving plate 30 and is configured to retain a piece of wall trim 70 on the top side 31 of the receiving plate 30 such than an end 74 of the wall trim 70 extends over an edge of the receiving plate 30 and toward the saw blade 27. A trim brace 44 is mounted to the top side 31 of the receiving plate 30 and is configured to restrict movement of the wall trim 70 on the top side 31. The clamping member 42 biases the wall trim 70 between the clamping member 42 and the trim brace 44. As can be seen in FIG. 1, a pair of clamping members 42 may be used for cutting the left or right ends of the wall trim 70.

The wall trim 70 is abuttable against the trim brace 44 when the wall trim 70 is clamped to the receiving plate 30 with the clamping member 42. The trim brace 44 has an inner edge 46 abuttable against the wall trim 70. The inner edge 46 has a longitudinal axis is orientated parallel to the top side 31. The trim brace 44 is pivotable to allow the inner edge 46 to be angled between +5° and −5° from being perpendicular with the axis of rotation of the saw blade 27.

A handle 48 is attached to the chassis 22 to facilitate movement of the chassis 22 with respect to the receiving plate 30 and the guide plate 32. The handle 48 may be abutted against and slidable on the frame 12 to provide for greater stability of the chassis 22.

Figure 7:
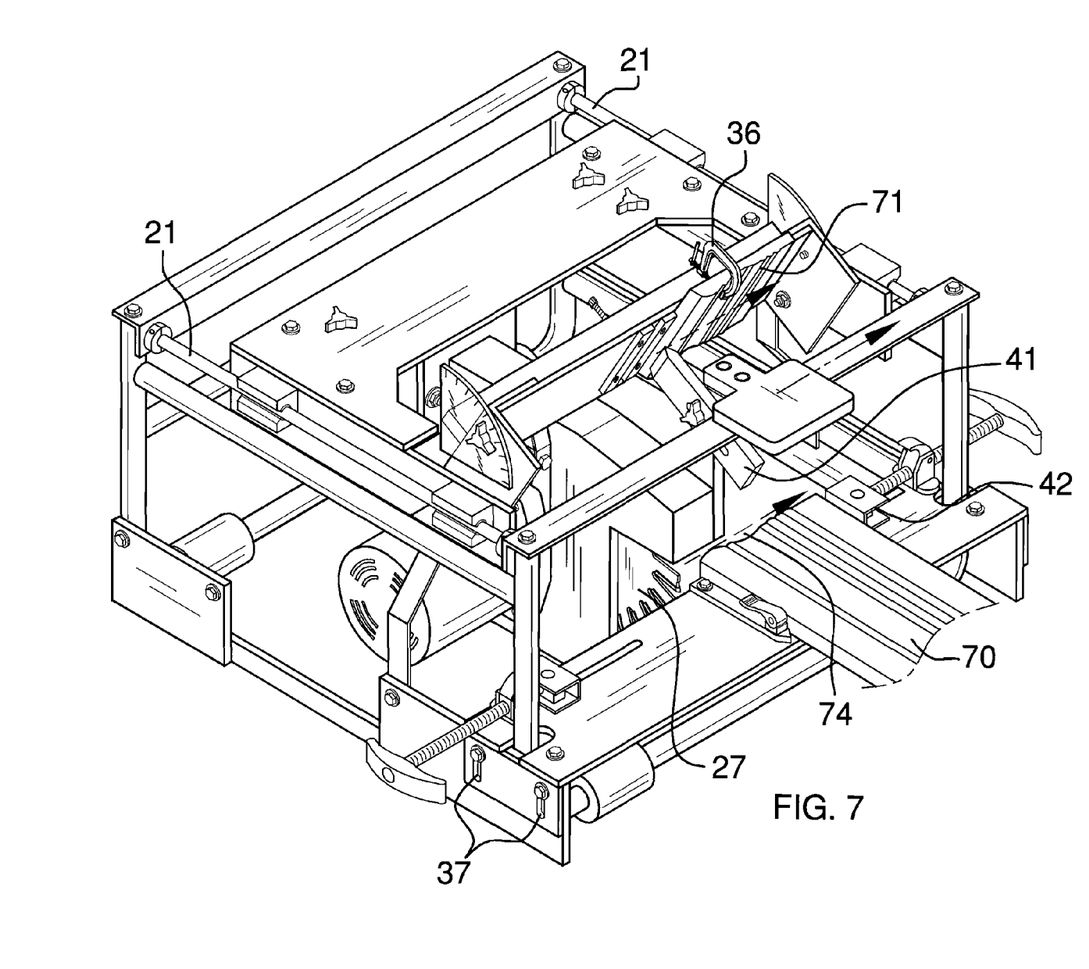
FIG. 7 is a perspective in-use view of an embodiment of the disclosure.
Figure 8:
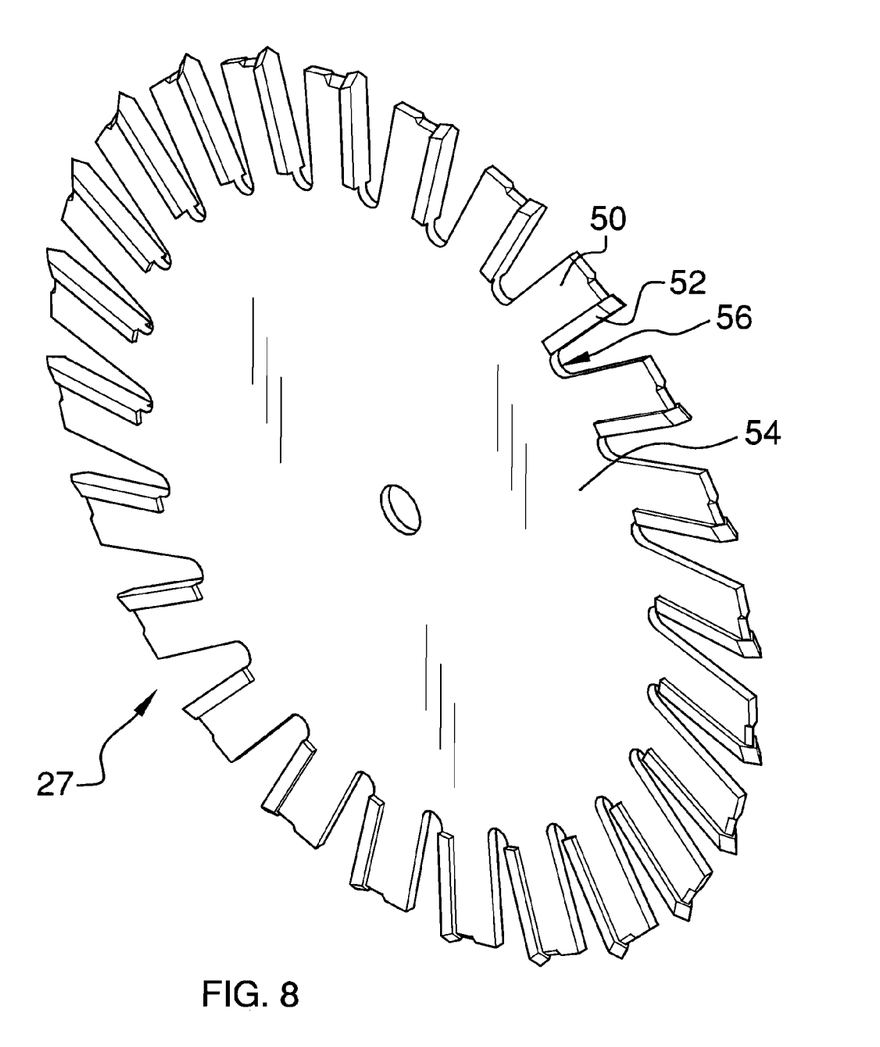
FIG. 8 is a perspective view of saw blade of an embodiment of the disclosure.
Figure 9:
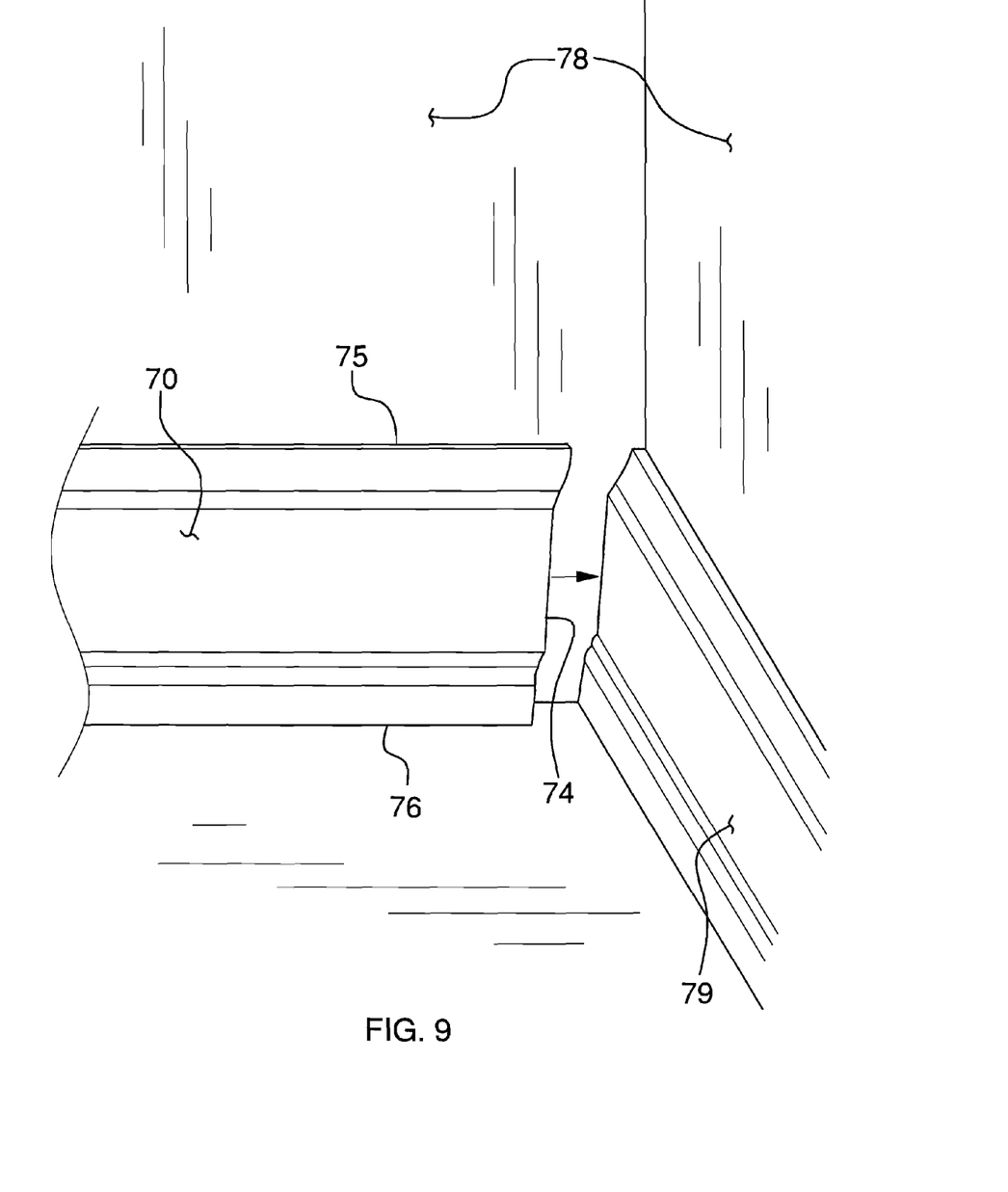
FIG. 9 is a perspective view of an embodiment of the disclosure.

It is noted that while a conventional circular saw blade may be used on some trims, particularly those that have no rounded areas, a modified saw blade 27, shown in FIGS. 7 and 8 may be employed. This type of saw blade 27 will include conventional shoulders 50 however this saw blade 27 will also include teeth 52 extending outwardly laterally from planes of a pair of opposed faces 54, 56 of a plate of the saw blade 27. As shown in the Figures, the teeth 52 may be positioned on the shoulders 50 and extend laterally away from the shoulders 50 as well. This allows the saw blade 27 to cut in three directions including opposed lateral directions and forward. It should be understood that these teeth 52 may further be mounted on, or through, the opposed faces 54, 56 themselves. The teeth, if mounted on the shoulders 50, may have a width that tapers inwardly from an outer end thereof toward a center of the saw blade 27. This will prevent jamming of the teeth 52 if they are used to cut wood in a conventional manner. However, this particular configuration of teeth 52 extending laterally from the saw blade 27 is particularly effective for the current assembly 10 to allow wall trim 70 to be coped laterally as wall trim 70 is brought laterally into the face 54 or 56 of the saw blade 27. The teeth 52 will typically have a length, starting at an outer end of the teeth 52 and extending along a line generally toward the center, greater than 1.25 cm.

In use, a piece of wall trim 70 to be coped is placed on the receiving plate 30 such that its end 74 extends over the receiving plate 30 and can be cut by the cutting assembly 25. The guide trim 71 is mounted on the guide plate 32 and the engagement member 38 adjusted so that it properly abuts the guide plate 32. The cutting assembly 25 is turned on and the engagement member 38 is moved across the contours of the guide trim 71 face. As the engagement member 38 follows the curves/contours, it causes the chassis 22 to move laterally between the first 18 and second 19 lateral sides as well as toward or away from the front side 16. In this manner the chassis 22 guides the cutting assembly 25 to cope the end 74 of the wall trim 70 in manner that it will properly engage another piece of wall trim 79 in the corner of adjoining walls 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cutting apparatus configured for coping a piece of a wall trim, said apparatus including:
a frame including an upper support, a lower support and a vertical support surrounding an interior, said frame including a front side, a back side, a first lateral side and a second lateral side;
a plurality of first rails being mounted to said frame and extending between said front and back sides of said frame;
a chassis being mounted on said first rails and being slidable along said rails to be moved towards or away from said front side, a second rail being mounted to said chassis and being orientated perpendicular to said first rails;
a cutting assembly including a saw blade and motor for rotating said saw blade, said cutting assembly being mounted on said second rail, said cutting assembly being movable toward said first or second lateral sides along said second rail;

a receiving plate being mounted on said frame and being positioned to allow said saw blade to move adjacent to said receiving plate;

a guide plate being mounted to said frame, said guide plate having a first side, said first side of said guide plate and a top side of said receiving plate each lying in a plane orientated parallel to an axis of rotation of said saw blade;

an engagement member being configured to engage and follow a contouring of a face of a guide trim removably clamped to said first side, said engagement member being mounted to said chassis;

a clamping member being mounted on said receiving plate and being configured to retain a piece of a wall trim on said top side of said receiving plate such than an end of the wall trim extends over an edge of said receiving plate and toward the saw blade.

2. The apparatus according to claim 1, wherein said saw blade is a circular saw blade.

3. The apparatus according to claim 1, wherein said cutting assembly is positioned to remain spaced from said receiving plate.

4. The apparatus according to claim 1, wherein said guide plate is rotatable to allow an angle of said first side with respect to a vertical plane to be altered.

5. The apparatus according to claim 1, wherein said engagement member includes a mount being attached to said chassis and a rod being attached to said mount, said rod extending toward said first side of said guide plate, said rod having a free end being configured to be movable across the face of the guide trim.

6. The apparatus according to claim 5, wherein said rod is movable on said mount to allow said rod to be moved toward or away from said first side, said rod being pivotable with respect to said mount to allow said free end to be vertically lifted or lowered.

7. The apparatus according to claim 1, further including a trim brace being mounted to said top side of said receiving plate, said trim brace being configured to restrict movement of the wall trim on said top side, wherein the wall trim is abuttable against said trim brace when the wall trim is clamped to said receiving plate with said clamping member.

8. The apparatus according to claim 7, wherein said trim brace has an inner edge abuttable against the wall trim, said inner edge having a longitudinal axis being orientated parallel to said top side, said trim brace being pivotable to allow said inner edge to be angled between +5° and −5° from being perpendicular with said axis of rotation of the saw blade.

9. The apparatus according to claim 1, further including a handle being attached to said chassis to facilitate movement of said chassis with respect to said receiving plate and said guide plate.

10. A cutting apparatus configured for coping a piece of a wall trim, said apparatus including:

a frame including an upper support, a lower support and a vertical support surrounding an interior, said frame including a front side, a back side, a first lateral side and a second lateral side;

a plurality of first rails being mounted to said frame and extending between said front and back sides of said frame;

a chassis being mounted on said first rails and being slidable along said rails to be moved towards or away from said front side, a second rail being mounted to said chassis and being orientated perpendicular to said first rails;

a cutting assembly including a saw blade and motor for rotating said saw blade, said cutting assembly being mounted on said second rail, said cutting assembly being movable toward said first or second lateral sides along said second rail, said saw blade being a circular saw blade, said cutting assembly being electrically powered;

a receiving plate being mounted on said frame and having a fixed position relative to said frame, said receiving plate being positioned adjacent to said front side of said frame, said receiving plate being positioned to allow said saw blade to move adjacent to but remain spaced from said receiving plate;

a guide plate being mounted to said frame and having a fixed position relative to said frame to allow said saw blade to move relative to said guide plate, said guide plate having a first side and a second side, said first side of said guide plate and a top side of said receiving plate each lying in a plane orientated parallel to an axis of rotation of said saw blade, said guide plate being rotatable to allow an angle of said first side with respect to a vertical plane to be altered;

an engagement member being configured to engage and follow a contouring of a face of a guide trim removably clamped to said first side, said engagement member being mounted to said chassis, said engagement member including a mount being attached to said chassis and a rod being attached to said mount, said rod extending toward said first side of said guide plate, said rod having a free end being configured to be movable across the face of the guide trim, said rod being movable on said mount to allow said rod to be moved toward or away from said first side, said rod being pivotable with respect to said mount to allow said free end to be vertically lifted or lowered;

a clamping member being mounted on said receiving plate and being configured to retain a piece of a wall trim on said top side of said receiving plate such than an end of the wall trim extends over an edge of said receiving plate and toward the saw blade;

a trim brace being mounted to said top side of said receiving plate, said trim brace being configured to restrict movement of the wall trim on said top side, wherein the wall trim is abuttable against said trim brace when the wall trim is clamped to said receiving plate with said clamping member, said trim brace having an inner edge abuttable against the wall trim, said inner edge having a longitudinal axis being orientated parallel to said top side, said trim brace being pivotable to allow said inner edge to be angled between +5° and −5° from being perpendicular with said axis of rotation of the saw blade; and a handle being attached to said chassis to facilitate movement of said chassis with respect to said receiving plate and said guide plate.

* * * * *